(12) United States Patent
Gerkensmeier et al.

(10) Patent No.: US 8,875,909 B2
(45) Date of Patent: Nov. 4, 2014

(54) DEVICE FOR TRANSPORTING OBJECTS

(75) Inventors: Christian Gerkensmeier, Roedinghausen (DE); Reinhard Hampker, Herford (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 118 days.

(21) Appl. No.: 13/520,851

(22) PCT Filed: Jan. 7, 2011

(86) PCT No.: PCT/EP2011/050173
§ 371 (c)(1),
(2), (4) Date: Sep. 12, 2012

(87) PCT Pub. No.: WO2011/086037
PCT Pub. Date: Jul. 21, 2011

(65) Prior Publication Data
US 2012/0325764 A1 Dec. 27, 2012

(30) Foreign Application Priority Data

Jan. 12, 2010 (DE) .................... 20 2010 000 875 U (51) Int. Cl.
*A47F 5/00* (2006.01)
*A47G 19/08* (2006.01)
(Continued)

(52) U.S. Cl.
CPC .................. *B65D 25/06* (2013.01); *A47B 57/58* (2013.01); *A47F 5/10* (2013.01); *B65G 49/064*
(Continued)

(58) Field of Classification Search
CPC ........ A47B 45/00; A47B 46/00; A47B 53/00;
A47B 55/00; A47B 57/00; A47B 57/58;
A47B 57/583; A47B 57/585; A47B 47/00;
A47B 43/00; A47F 5/10; A47F 5/005; A47F
7/0042; A47F 7/00; A47F 5/0081; A47F
5/0093; A47F 5/00; A47F 5/105; B65G
49/05; B65G 49/06; B65G 49/063; B65G
49/064; B65G 49/07; B65D 85/48; B65D
19/02; B65D 19/38; B65D 19/44; B65D
25/00; B65D 25/005; B65D 25/04; B65D
25/06; B65D 2519/00333; B65D 2519/0082;
B65D 2519/00174; B65D 2519/00666; B65D
2519/00164; B65D 25/00631; B60P 3/002
USPC ............ 211/175, 41.13, 41.14, 41.15, 41.16,
211/41.17, 41.18, 201, 184, 43, 10, 162;
108/55.1, 55.3, 55.5, 54.1, 57.15,
108/57.29, 60; 312/205; 52/64; 220/529,
220/530, 531, 532, 533, 534, 549
See application file for complete search history.

(56) References Cited

U.S. PATENT DOCUMENTS 3,519,140 A * 7/1970 Wellman, Jr. ................. 211/162
4,261,464 A * 4/1981 Maitland ....................... 206/708
(Continued)

FOREIGN PATENT DOCUMENTS

DE 41 39 761 6/1993
DE 296 02 672 5/1996
(Continued)

*Primary Examiner* — Jennifer E Novosad
(74) *Attorney, Agent, or Firm* — Michael J. Striker (57) ABSTRACT

A device for transporting objects, in particular fittings, having a frame includes outer walls (2, 3) protruding upwards from a floor at opposite end faces, on which a plurality of receiving hoppers (4) are provided for placing a first end section of an object, and at least one middle wall section (5, 5') protruding from the floor. A plurality of receiving hoppers (4) is provided thereon for placing a second end section of an object opposite the first end section. At least one middle wall section (5, 5') is displaceably mounted on a floor guide and can be fixed at different distances from an outer wall (2, 3).

14 Claims, 9 Drawing Sheets

(51) Int. Cl.
  *B65D 25/06* (2006.01)
  *B65D 19/44* (2006.01)
  *A47B 57/58* (2006.01)
  *A47F 5/10* (2006.01)
  *B65G 49/06* (2006.01)
  *A47F 7/00* (2006.01)
  *A47B 45/00* (2006.01)

(52) U.S. Cl.
  CPC ........ (2013.01); *A47F 7/0042* (2013.01); *A47B 57/583* (2013.01); *A47F 5/0093* (2013.01); *A47B 45/00* (2013.01); *B65D 19/44* (2013.01); *B65D 2519/00164* (2013.01); *B65D 2519/00174* (2013.01); *B65D 2519/00333* (2013.01); *B65D 2519/00631* (2013.01); *B65D 2519/00666* (2013.01); *B65D 2519/0082* (2013.01)
  USPC .......... 211/175; 211/184; 211/41.14

(56) References Cited

U.S. PATENT DOCUMENTS

| | | | | |
|---|---|---|---|---|
| 4,898,283 A * | 2/1990 | Kingsford | ............. | 211/57.1 |
| 4,919,277 A * | 4/1990 | Jeruzal | ............. | 211/85.8 |
| 4,991,725 A * | 2/1991 | Welsch et al. | ............. | 211/162 |
| 5,037,256 A * | 8/1991 | Schroeder | ............. | 410/143 |
| 5,214,572 A * | 5/1993 | Cosimano et al. | ............. | 361/802 |
| 5,520,316 A * | 5/1996 | Chen | ............. | 224/539 |
| 5,762,208 A * | 6/1998 | Yeh | ............. | 211/40 |
| 5,938,047 A * | 8/1999 | Ellis et al. | ............. | 211/1.57 |
| 6,128,187 A * | 10/2000 | Mimlitch et al. | ............. | 361/690 |
| 6,146,068 A * | 11/2000 | Schroeder | ............. | 410/35 |
| 6,422,405 B1 * | 7/2002 | Haenszel | ............. | 211/175 |
| 6,588,605 B1 * | 7/2003 | Volkert et al. | ............. | 211/41.14 |
| 6,739,463 B2 * | 5/2004 | Wishart et al. | ............. | 211/189 |
| 6,749,072 B2 * | 6/2004 | Matsuda et al. | ............. | 211/41.17 |
| 7,014,402 B2 * | 3/2006 | Kessler | ............. | 410/155 |
| 7,246,708 B2 * | 7/2007 | Chuang et al. | ............. | 211/41.18 |
| 7,469,793 B2 * | 12/2008 | Chen | ............. | 211/162 |
| 7,591,382 B2 * | 9/2009 | Brock | ............. | 211/10 |
| 8,104,627 B2 * | 1/2012 | Ponto | ............. | 211/41.14 |
| 2005/0041325 A1 | 2/2005 | Chuang et al. | | |
| 2006/0226093 A1 * | 10/2006 | Cho et al. | ............. | 211/41.14 |
| 2008/0258587 A1 | 10/2008 | Mayuzumi | | |

FOREIGN PATENT DOCUMENTS

| | | |
|---|---|---|
| DE | 198 31 640 | 3/1999 |
| DE | 197 46 696 | 5/1999 |
| DE | 698 21 438 | 9/2004 |
| DE | 20 2005 014 074 | 12/2005 |
| FR | 2 816 918 | 5/2002 |
| FR | 2 880 870 | 7/2006 |
| GB | 2 412 910 | 10/2005 |
| JP | 11-91909 | 4/1999 |
| JP | 2002-120837 | 4/2002 |
| JP | 2002-171085 | 6/2002 |

\* cited by examiner

DEVICE FOR TRANSPORTING OBJECTS

CROSS-REFERENCE TO A RELATED APPLICATION

The invention described and claimed hereinbelow is also described in German patent Application DE 20 2010 000 875.1 filed on Jan. 12, 2010. This German Patent Application, whose subject matter is incorporated here by reference, provides the basis for a claim of priority of invention under 35 U.S.C. 119 (a)-(d).

BACKGROUND OF THE INVENTION

The present invention relates to a device for transporting objects.

Lattice boxes or pallet containers in which objects produced in production facilities are placed are known for the storage and transport of objects. As a result, the objects are disordered and are difficult to remove in an automated fabrication process. In addition, the objects can be damaged during transport and/or when filling the lattice boxes.

Transport devices are known in which the objects are placed in fixed magazines. By this means the objects can be positioned exactly for a subsequent removal and are additionally protected from damage. However, such transport devices are not flexible and the magazines can only be used for objects of predetermined size.

DE 41 39 761 discloses a transport device for goods in which a frame-shaped circumferential frame is mounted on a supporting surface. The frame comprises supports and traverses on which retainers for supporting objects are mounted which can be fixed in different positions. Transporting and retaining heavy objects is only possible to a limited extent with this structure. Due to the frame-shaped configuration of the frame the accessibility from the side is made difficult.

SUMMARY OF THE INVENTION

It is therefore the object of the present invention to provide a device for transporting objects which ensures secure transport of objects with a simple structure and can be adapted flexibly to different-sized objects.

According to the invention, the device for transporting objects comprises at least one middle wall section between the outer walls, which is displaceably mounted on a floor guide and can be fixed at different distances from an outer wall. As a result, a plurality of magazines can be formed between the displaceable middle wall section and an outer wall, in which corresponding objects can be placed. In doing so, the object is placed with one end section in a receiving hopper on an outer wall and on the opposite side in a receiving hopper on the middle wall section. If the length of the objects to be placed changes, for example, as a result of a changeover in production, the device can be further used, merely the middle wall section is displaced and adapted in position to the length of the objects to be placed. By this means, a high degree of flexibility can be provided with a device for transporting objects, where the objects in the individual hoppers are disposed in exact positions and can then be gripped in an automated fabrication process.

Preferably a plurality of displaceably mounted wall sections are provided between the outer walls so that a plurality of rows with placed objects can be formed in the device for transporting objects. In particular, two, three or four displaceable wall sections can be mounted displaceably on the floor.

For easy displacement of the wall sections, these can be guided on the floor on at least one rail. In this case, the at least one rail can be configured to be U-shaped in cross-section where at least one roller connected to the wall section is guided in the rail. This ensures smooth-running guidance and prevents canting of the wall sections. In order to improve the guidance of the wall sections, the wall section can have a carriage on the floor on which at least two rollers spaced apart from one another in the longitudinal direction of the rail are mounted on the carriage. If each displaceable wall section has at least two carriages on the floor side, which are guided on parallel rails, canting of the wall sections can be reliably avoided.

According to a preferred embodiment, each hopper has a floor section on which the lowest object rests with an end section. This ensures that the objects are positioned exactly in height and in addition weight forces can be removed via the wall sections to the frame or the rails. This can prevent the weight forces from acting on the guide elements such as the rollers in order to avoid damage at higher weight loads, in particular when placing metal components thereon.

For fixing the at least one middle wall section, at least one retaining element is preferably disposed between the outer walls on which the displaceable wall sections can be fixed. In this case, in order to avoid tilting movements of the wall sections, at least one retaining element can be disposed at least on one side, at a distance from the floor, preferably in the upper half of the wall sections.

In order to enable an adjustment process in a simple manner, the retaining elements can be configured as toothed racks, on which the wall sections can be fixed at predetermined positions. Locking positions can thus be predefined by means of the toothed racks so that the hoppers on the outer walls and the displaceable wall sections can be positioned exactly with respect to one another. The retaining elements in a first position can be out of engagement with the at least one displaceable wall section and in a second position fix the at least one wall section. For easy handling the retaining elements in the first and the second position can be engaged by means of a sliding block guide so that a single operator can execute an adjustment process.

BRIEF DESCRIPTION OF THE DRAWINGS

The invention is explained in detail hereinafter by means of several exemplary embodiments with reference to the appended drawings. In the figures.

DETAILED DESCRIPTION OF THE PREFERRED EMBODIMENTS

Figure 1:
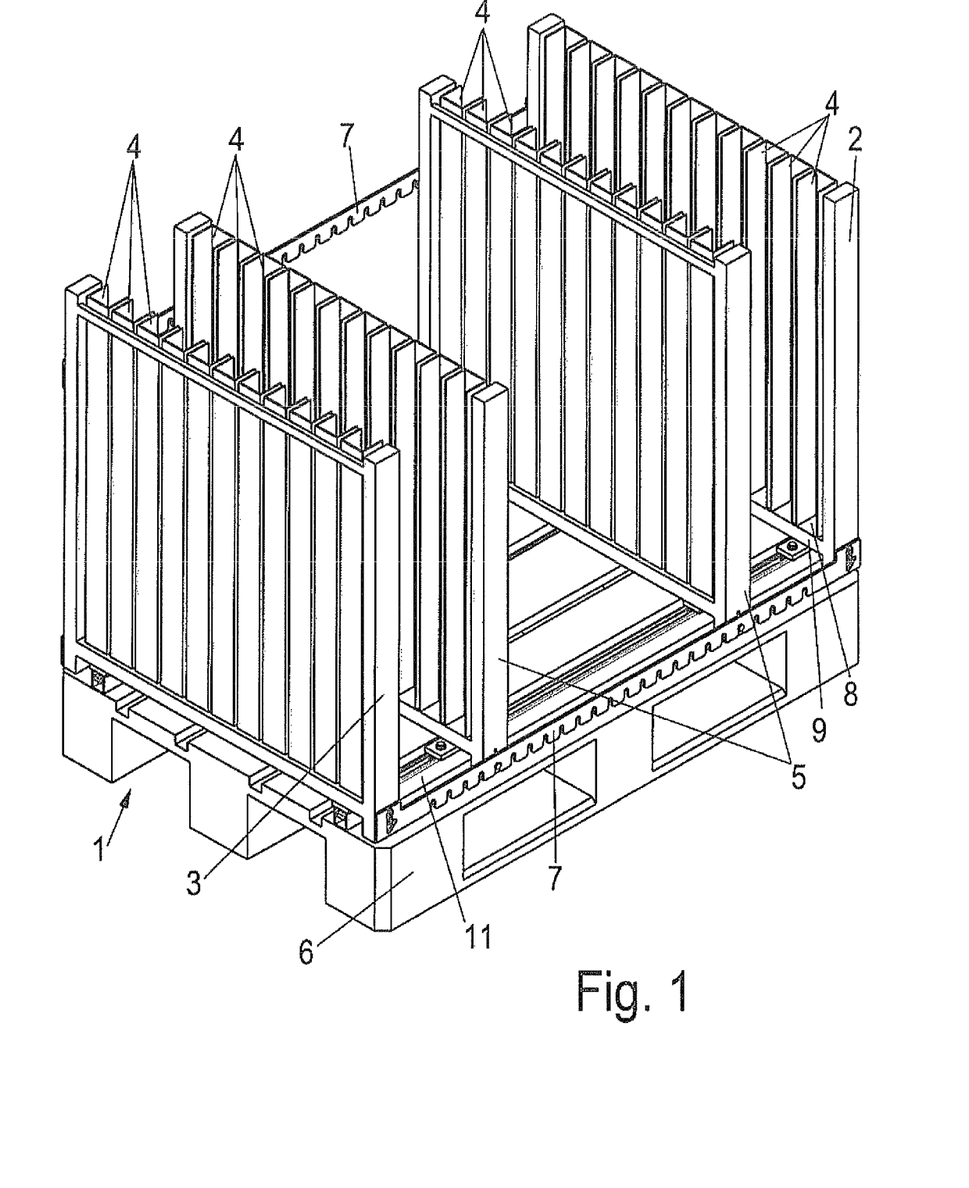
FIG. 1 shows a perspective view of a device according to the invention for transporting objects.
Figure 2:
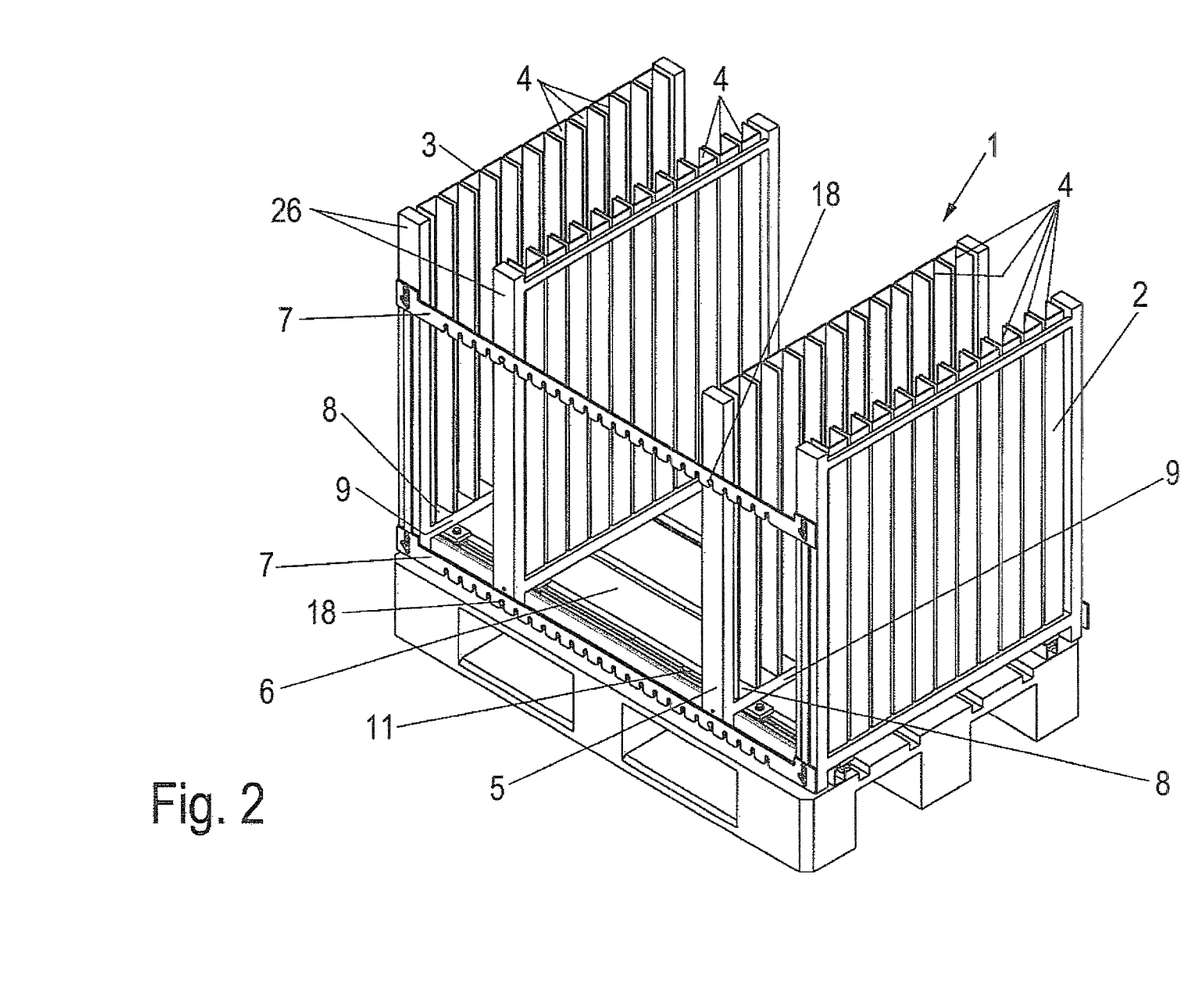
FIG. 2 shows a perspective view of the device of FIG. 1.

A device 1 for storing and transporting objects is substantially configured to be rectangular and comprises at opposite end faces outer walls 2 and 3, on which a plurality of receiving hoppers 4 are formed. Two wall sections 5 are provided between the outer walls 2 and 3, and which are mounted displaceably on the floor side. The wall sections 5 also have receiving hoppers 4 on one side or on both sides, which are disposed opposite the receiving hoppers 4 on the outer walls 2 and 3. As a result, an object, for example, a profile rail, can be inserted with a first end section in a receiving hopper 4 on an outer wall or 3 and with a second end section in a receiving hopper 4 on a wall section 5. The receiving hoppers 4 are formed by U-shaped profiles so that the end sections of the object are arranged in a protected manner.

The floor of the device 1 comprises a pallet 6 which is configured as a standardized Euro pallet and on which two rails 11 are mounted, which are spaced apart from one another in the longitudinal direction. The wall sections 5 are held displaceably on the rails 11, where the wall sections 5 are fixed at predetermined positions by retaining elements 7. The retaining elements 7 are configured as toothed racks, where a retaining element 7 is provided on the floor on opposite sides and on one side a retaining element 7 is also disposed in the upper area of the wall sections 5.

The outer walls 2 and 3 as well as the wall sections 5 each comprise a cross-beam 9 on the floor side, the upper side of which forms a floor 8 in a receiving hopper 4. As a result, the load of the objects placed in the receiving hoppers 4 is distributed over the cross-beam 9.

Figure 3:
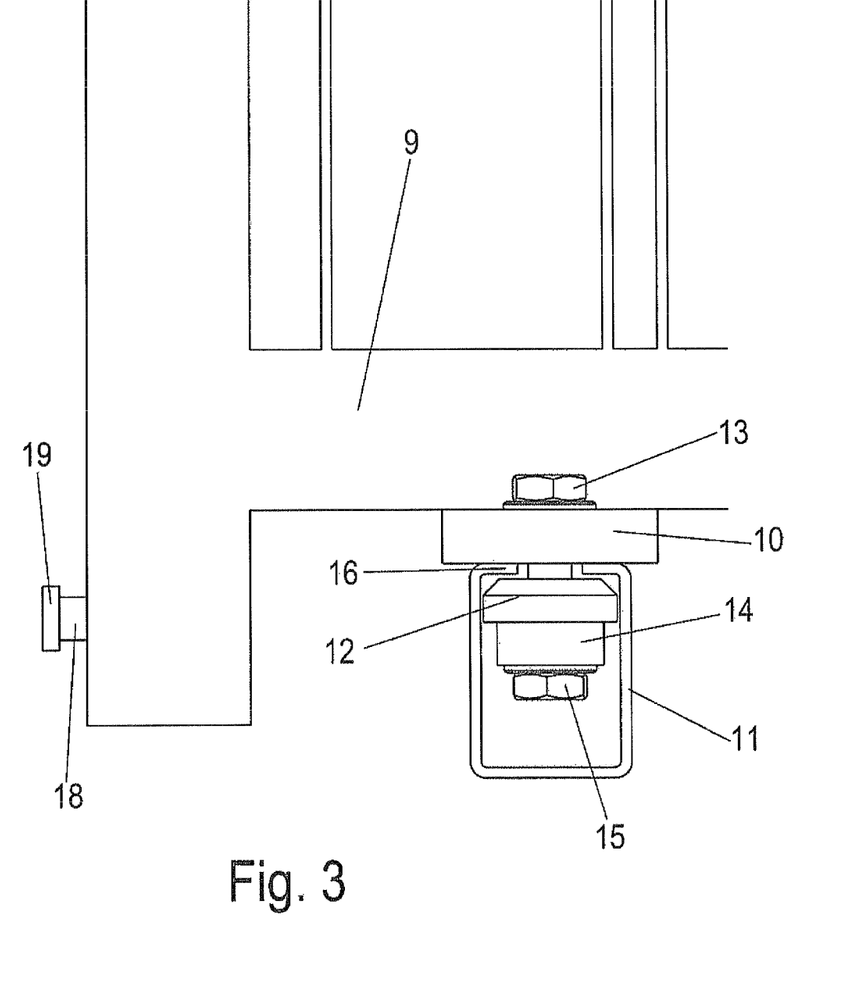
FIG. 3 shows a detailed view of the device of FIG. 1 in the floor area.
Figure 4:
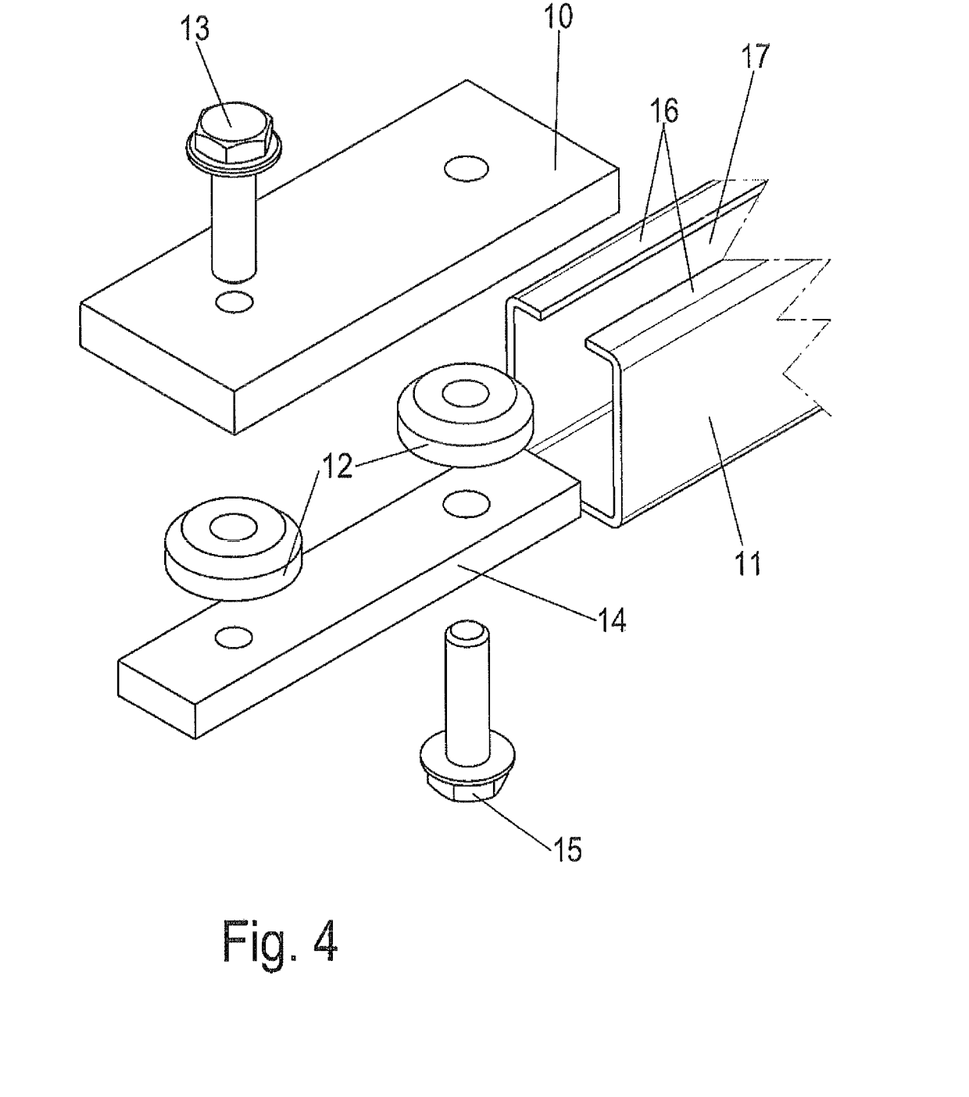
FIG. 4 shows a perspective exploded view of the carriage of a displaceable wall section.

As shown in FIG. 3, the cross-beam 9 of an outer wall 2 or 3 or of a wall section 5 is supported on a retaining plate 10, which rests on the rail 11 having a U-shaped cross-section. The rail 11 has inwardly bent sections 16 on both legs, which form a flat supporting surface for the retaining plate 10. Two rollers 12 spaced apart from one another in the longitudinal direction of the rail 11 are mounted rotatably on the retaining plate 10, where the rollers 12 are disposed with little play between the legs of the rail 11. A web 14 is provided below the rollers 12, where the rollers 12 are mounted between the retaining plate 10 and the web 14 by means of a first screw 13 and a second screw 15. The screws 13 and 15 can be mounted as desired from above or below into the retaining plate 10 or the web 14. The rollers 12 are disposed in the rail 11 so that during a sliding movement of a wall section 5 along the rail 11, a lateral guidance is given, but the wall section 5 is also secured against lifting or tilting since the rollers 12 are disposed below the inwardly bent webs 16. The lateral guidance is accomplished by means of the rollers 12 whilst the screws 13 or 15 are guided through a slit 17 between webs 16.

Laterally protruding bolts 18 having a thickened head section 19 are provided on vertical posts 26 on the outer walls 2 and 3 and the wall sections 5. The bolts on the outer walls 2 and 3 are preferably configured as threaded bolts.

Figure 5:
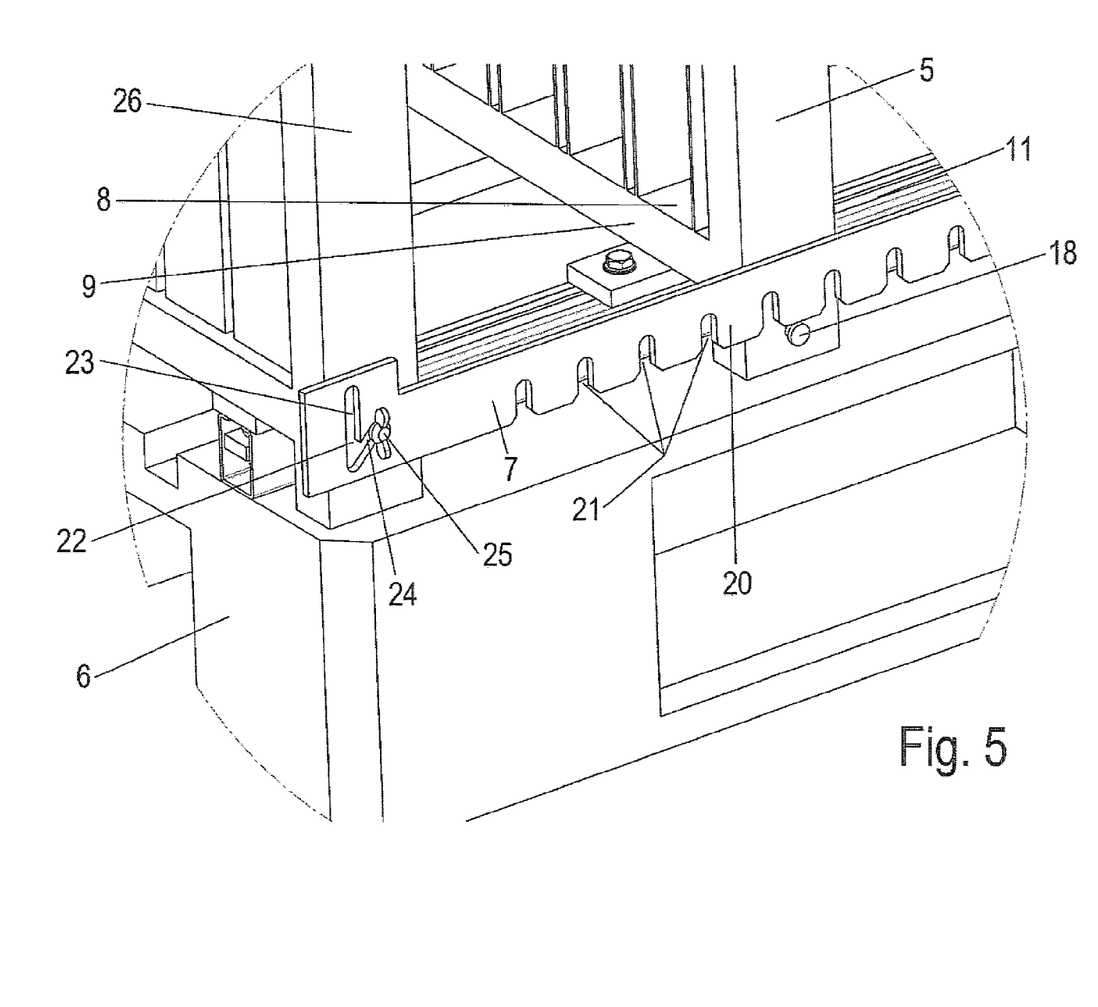
FIG. 5 shows a perspective detailed view of a retaining element of the device of FIG. 1 in a first position.

FIG. 5 shows the device 1 in a position in which the middle wall sections 5 can be displaced along the rails 11. For this purpose the retaining elements 7 are fixed in a raised position. The retaining elements 7 are configured as toothed racks and comprise in the central area a plurality of teeth 20 which are spaced apart from one another by recesses 21 open at the bottom. A bolt 18 of a wall section 5 can be inserted in each recess 21.

Figure 6:
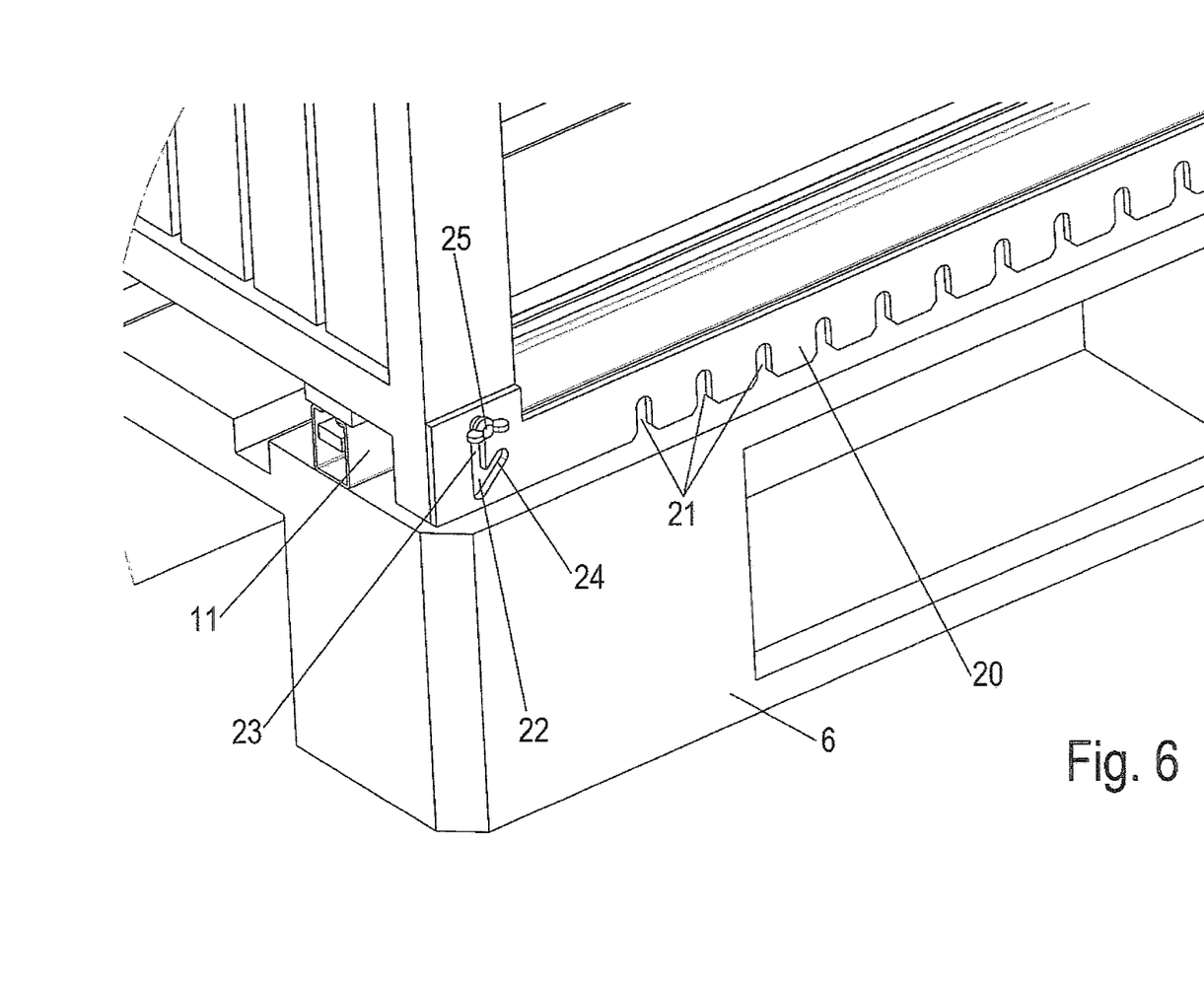
FIG. 6 shows a perspective detailed view of a retaining element of the device of FIG. 1 in a fixing position.

In the area of a post 26 of the outer walls 2 and 3 a sliding block guide 22 is formed on the retaining element 7, which is arranged in a V shape and has a perpendicular leg 23 and a shortened angular leg 24. In order to fix the retaining element 7 in a raised position, a nut 25 is released and the retaining element 7 is raised upwards along the bolt 18 until the recesses 21 are out of engagement with a bolt 18 on the wall section 5. In this position, when all three retaining elements 7 are arranged out of engagement with the bolts 18 on the wall sections 5, the wall sections 5 can be displaced along the rails 11, where the rollers 12 on the carriage disposed on the floor side provide for exact guidance. After the wall section 5 has been displaced in the predefined grid spacing, a fixing can be made. For this purpose the retaining elements 7 are each moved obliquely upwards along the sliding block guide 22 in order to be lowered into the perpendicular leg 23 of the sliding block guide 22. When lowering, care must be taken to ensure that the bolts 18 engage in a corresponding recess 21 between two teeth 20. After the lowering of the retaining elements 7, the position shown in FIG. 6 is achieved. The wall sections 5 can now no longer be moved along the rail 11. When objects are placed in the receiving hoppers 4, the weight force of the objects provides for stabilisation of the outer walls 2, 3 and the wall sections 5, since the cross-beams 9 are loaded and rest with their lower supporting surface on the flat rails 11. Movements of the middle wall sections 5 are thereby avoided in particular when the device 1 is completely filled with objects.

Figure 7:
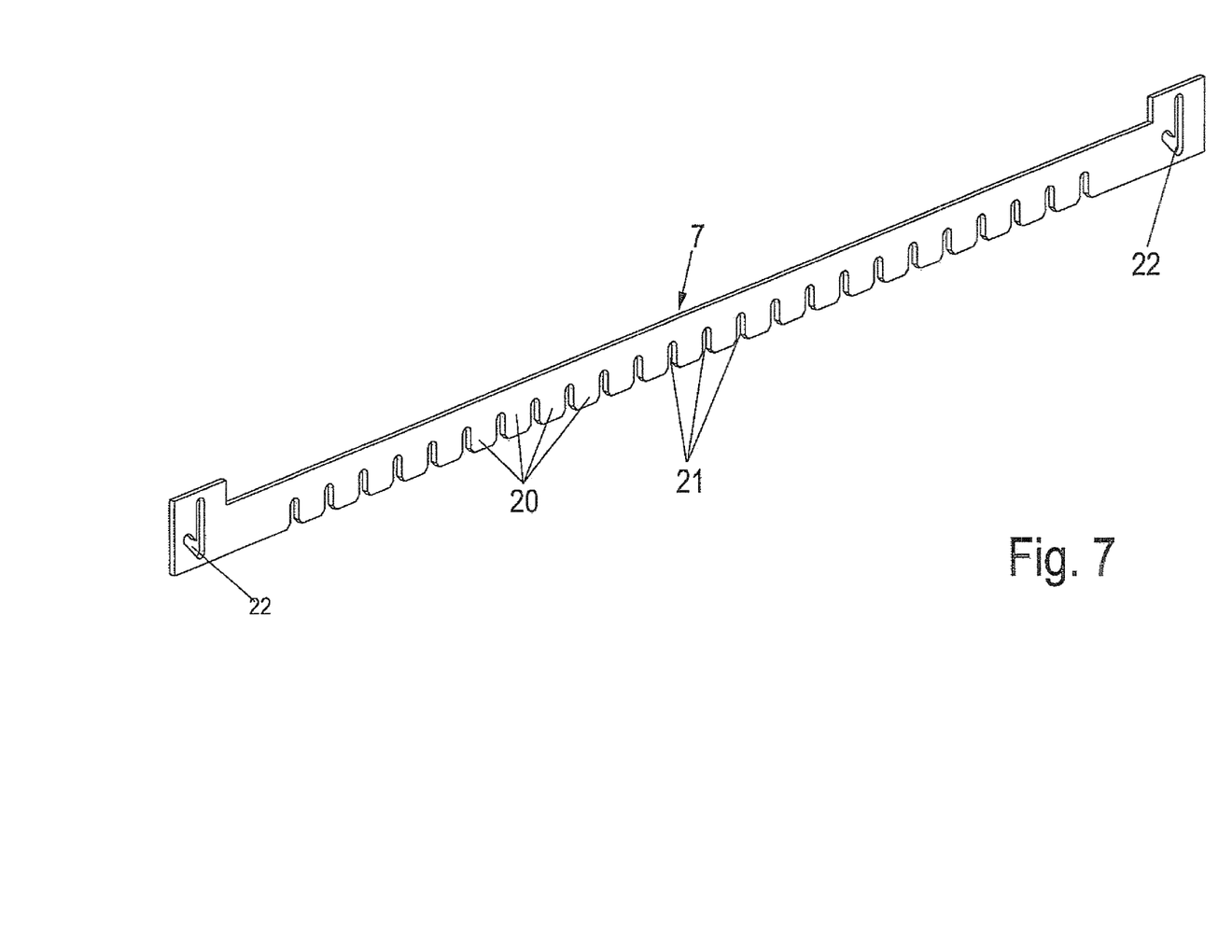
FIG. 7 shows a perspective view of the retaining element.

FIG. 7 shows a retaining element 7 in detail, which is configured as a toothed rack and has a sliding block guide 22 on opposite end sections. A plurality of teeth 20 and recesses 21 are provided in a middle section, which predefine the grid spacing in which the wall sections 5 can be displaced and fixed.

Figure 8:
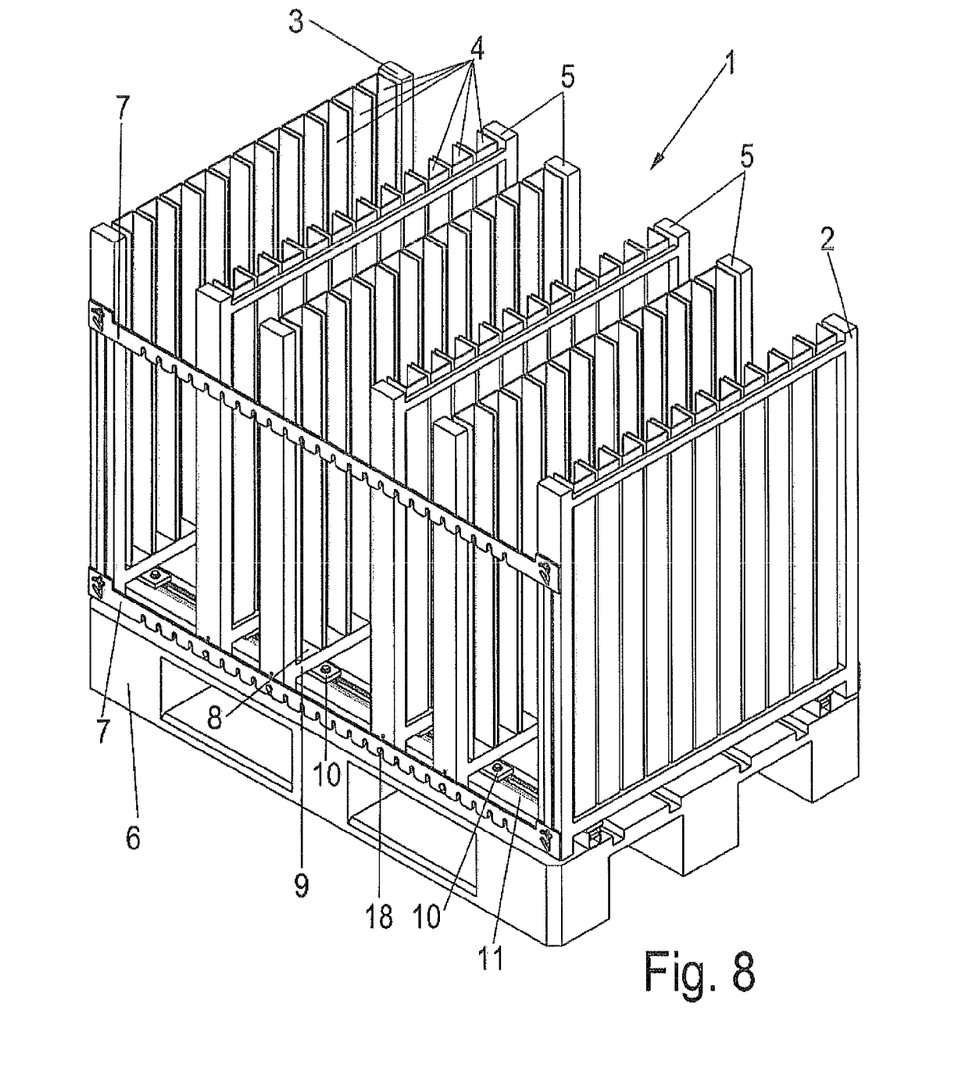
FIG. 8 shows a perspective view of a second exemplary embodiment of a device according to the invention.

FIG. 8 shows a modified embodiment 1' for storing and transporting objects, in which four middle wall sections 5 are positioned instead of two middle wall sections 5. As a result, the spacing between two opposite receiving hoppers 4 has been reduced whilst more objects can be accommodated since three rows having a plurality of receiving hoppers 4 are provided. It is possible to adjust the distance of the outer walls 2 or 3 from a middle wall section 5 and also to vary the distance between two middle wall sections 5. Furthermore, the number of wall sections 5 disposed between the outer walls 2 and 3 can also be varied with the device 1 or 1' according to the invention.

The outer walls 2 and 3 can be fixed on the rails 11 or the pallet 6 by means of fixed connecting means. It is also possible to form the outer walls 2 and 3 as displaceable wall sections 5.

The outer walls 2 and 3 as well as the wall sections 5 preferably consist of metal sheet but can also be made of plastic or other materials. Instead of the three retaining elements 7, only two retaining elements 7 or more than three retaining elements 7 can also be provided.

Figure 9:
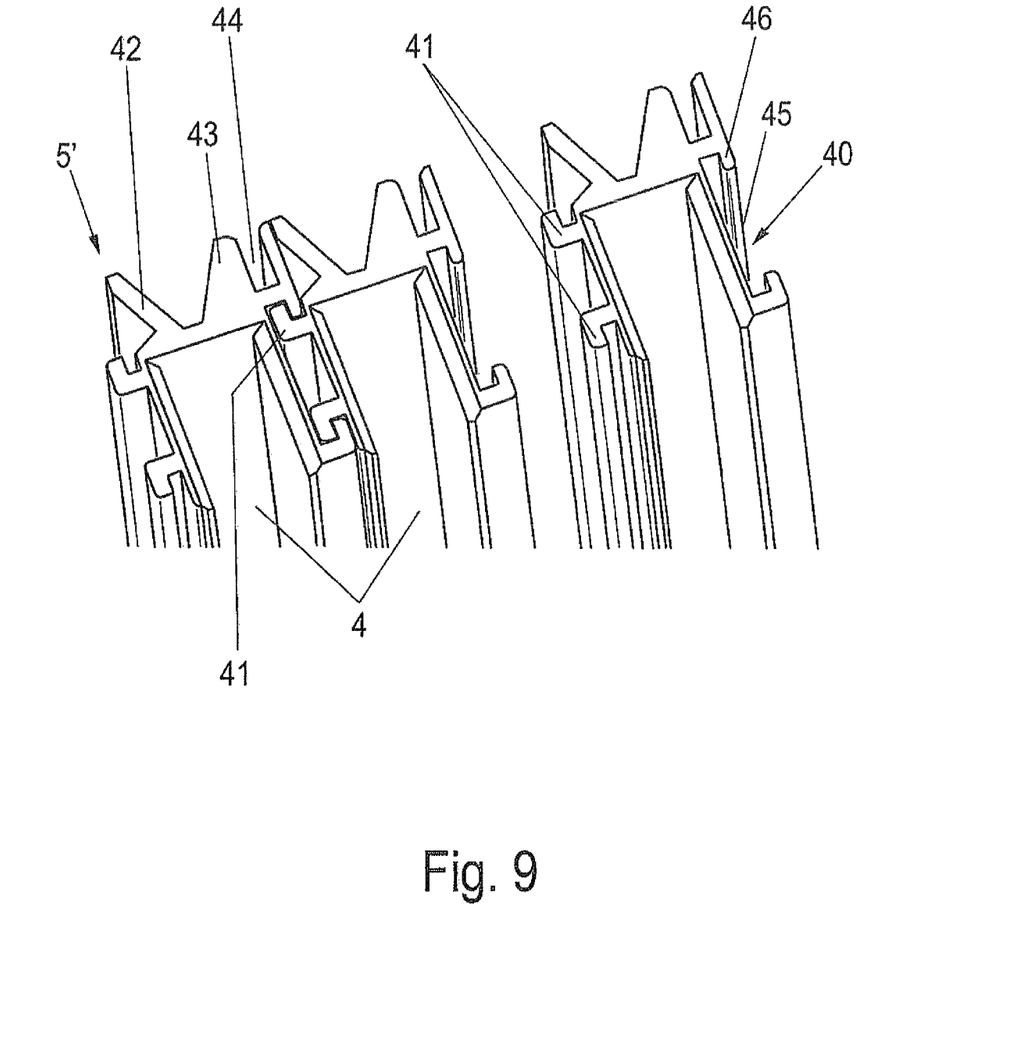
FIG. 9 shows a perspective view of a modified exemplary embodiment.

FIG. 9 shows a modified embodiment of a wall section 5' formed from a plurality of plug-in profiles 40 plugged into one another. Each plug-in profile 40 comprises a receiving hopper 4 in which an end section of an elongate object can be inserted. On the side facing an adjacent plug-in profile, a groove 45 is formed which has inwardly directed webs 46. On the opposite side each plug-in profile 40 has two hook-shaped webs 41 which can be inserted into the groove 45 in order to lock the adjacent plug-in profiles 40 to one another.

On a rear side opposite the receiving hoppers 4 two wedge-shaped strips 42 and 43 as well as a screw groove 44 are formed for reinforcement. Cross traverses for supporting the wall section 5' formed from plug-in profiles 40 can be fixed in the screw groove 44. The plug-in profiles 40 can be formed as extruded aluminium profiles so that damage to harder objects is avoided.

The invention claimed is:

1. A device for transporting objects, comprising:
   a frame comprising outer walls (2, 3) and opposite end faces, said outer walls (2, 3) protruding upwards from a floor at said opposite end faces;
   a plurality of receiving hoppers (4) disposed at said opposite end faces for placing a first end section of an object, wherein the receiving hoppers (4) are formed by U-shaped profiles such that end sections of the objects are disposed in a protected manner; and
   at least one middle wall section (5, 5') protruding from the floor, wherein a plurality of receiving hoppers (4) are provided on said at least one middle wall section for placing a second end section of an object opposite the first end section, wherein the at least one middle wall section (5, 5') is displaceably mounted on a floor guide and can be fixed at different distances from said outer walls (2, 3), and wherein the outer walls (2, 3) and the at least one middle wall section (5, 5') comprise a cross-beam disposed on a side facing the floor, wherein an upper side of the cross beam forms a floor portion (8) in said receiving hoppers (4), whereby a load of the objects positioned in the receiving hoppers (4) is distributed over the cross-beam.

2. The device according to claim 1, wherein a plurality of displaceable middle wall sections (5, 5') are provided between the outer walls (2, 3).

3. The device according to claim 2, wherein the displaceable middle wall sections (5, 5') are guided on the floor on at least one rail (11).

4. The device according to claim 3, wherein the at least one rail (11) is U-shaped in cross-section and at least one roller (12) connected to the displaceable middle wall sections (5, 5') is guided in the rail (11).

5. The device according to claim 4, wherein at least one of the displaceable middle wall sections (5, 5') has a carriage on a floor side, wherein at least two rollers (12) spaced apart from one another in the longitudinal direction of the rail (11) are mounted on the carriage.

6. The device according to claim 5, wherein said at least one of the displaceable middle wall sections (5, 5') is supported on the floor side by means of at least two carriages on two parallel rails (11).

7. The device according to claim 1, wherein each receiving hopper (4) has a floor section (8) on which a lowest object rests with an end section.

8. The device according to claim 1, wherein at least one retaining element (7) is disposed between the outer walls (2, 3) on which the at least one middle wall section (5, 5') can be fixed.

9. The device according to claim 8, wherein a retaining element (7) is disposed at least on one side of said at least one middle wall section, at a distance from the floor, in an upper half of the at least one middle wall section (5, 5').

10. The device according to claim 8, wherein the retaining element (7) is a toothed rack, on which the wall sections (5, 5') can be fixed at predetermined positions.

11. The device according to claim 10, wherein the retaining element (7) in a first position is out of engagement with the at least one middle wall section (5, 5') and in a second position, the at least one wall middle section (5, 5') is fixed in said retaining element (7).

12. The device according to claim 11, wherein the retaining element (7) in the first and the second position can be engaged with a sliding block guide (22).

13. The device according to claim 1, wherein the at least one middle wall section (5') is formed by a plurality of plug-in profiles (40).

14. The device according to claim 13, wherein a pallet (6) is disposed on the underside of the frame.

* * * * *